United States Patent [19]
Nolte

[11] 3,889,523
[45] June 17, 1975

[54] LEAK-DETECTION APPARATUS AND LIQUID LEVEL VARIATIONS DETECTOR

[75] Inventor: David G. Nolte, Richmond, Va.

[73] Assignee: Texaco Inc., New York, N.Y.

[22] Filed: Mar. 8, 1974

[21] Appl. No.: 449,414

[52] U.S. Cl. ............................ 73/49.2; 73/290 V
[51] Int. Cl. ........................................... G01f 23/28
[58] Field of Search... 73/290 R, 290 V, 40, 40.5 A, 73/67.1, 67.2, 67.6, 49.2, 49.3

[56] References Cited
UNITED STATES PATENTS

| | | | |
|---|---|---|---|
| 2,746,480 | 5/1956 | Hildyard | 73/290 V X |
| 3,010,318 | 11/1961 | Mongan | 73/290 V |
| 3,133,442 | 5/1964 | Werner | 73/290 V |
| 3,460,386 | 8/1969 | Guignard | 73/290 R |

Primary Examiner—Charles A. Ruehl
Attorney, Agent, or Firm—T. H. Whaley; C. G. Ries; Henry C. Dearborn

[57] ABSTRACT

A highly accurate liquid level detector employing ultrasonic acoustics. It may be especially useful in indicating leaks in large-volume tanks, and particularly where such tanks have large diameter-to-height ratios. The liquid level detector employs a piezoelectric transmitter that is submerged in the liquid, and is associated with a piezoelectric receiver having a geometric configuration such that the amount of immersion of the latter in the liquid determines the amplitude of the signals generated as acoustic resonance conditions are approached.

13 Claims, 7 Drawing Figures

LEAK-DETECTION APPARATUS AND LIQUID LEVEL VARIATIONS DETECTOR

BACKGROUND OF THE INVENTION

1. Field of the Invention

This invention concerns liquid level measurement in general, and particularly relates to apparatus for making a highly accurate liquid level determination, particularly as to a variation of such level. The invention also concerns the application of such accurate liquid level measurement to an instrument for determining leakage in large tanks.

2. Description of the Prior Art

Present methods for detecting leaks in large-diameter storage tanks are complicated, time-consuming, and unreliable. One of the American Petroleum Institute's methods for detecting leaks in newly constructed storage tanks, for example, requires that the tank be emptied of product and that a dike be constructed around the tank. The diked area would be flooded and the inside of the tank inspected for signs of water seepage up through the bottom. An obvious shortcoming of such method is that the pressure is considerably less than the head normally found in a filled tank.

Another frequently used method is to fill the empty tank with water and observe the change in liquid level over an extended period of time using tape gages or other conventional level-monitoring means. However, because of engineering and cost considerations, liquid storage tanks are usually designed with large diameter-to-height ratios. Thus, tank heights are usually limited to 50 or 60 feet whereas diameters as large as 150 feet are commonplace. Since the loss of one barrel from a 150-foot-diameter tank would lower the surface level only 0.004 inches, it can be seen that leaks of even sizeable magnitudes would require an inordinate amount of time to detect using existing surface-monitoring techniques. For instance, at a leak rate of one barrel per day, 31 days would be required for the level to change ⅛ inch. This is about the limit of the resolution which can be expected from most tape gages. Existing methods are further complicated by the fact that the effects of surface evaporation and thermal expansion for the test period must be calculated to determine the true level change due to leaks.

In addition, although heretofore, there has been a suggestion for measuring liquid level which system employed resonating air columns located above the surface of the liquid, the accuracy of such arrangement would be clearly inadequate for the purpose of this invention.

Furthermore, while there are known systems that employ acoustic high-frequency measurements, these make use of pulse-echo systems, and such arrangements are quite complex and expensive. Additionally, the concept of isolating a column of liquid from the rest of the tank for a given period of time in order to measure the difference between the isolated liquid level and the rest of the tank, is well-known. However, in such a combination, there has not been any known liquid level-measuring elements that have sufficient accuracy for the above-indicated applications.

Consequently, it is an object of this invention to provide superior apparatus that may be used to detect leakage in large-diameter liquid tanks. Also, the invention contemplates a superior liquid-level-measuring system having extremely high accuracy.

SUMMARY OF THE INVENTION

Briefly, this invention concerns a liquid level variation detector which comprises in combination a submerged means for transmitting acoustic energy into said liquid, and signal-transducer means immersed in said liquid a variable amount, depending upon the said liquid level. In such detector the said detector means has a geometric configuration for producing a resonant condition in a predetermined amount of immersion, and it includes electric circuit means including said transducer means for indicating said liquid level variation.

Again, briefly, the invention relates to leak detection of liquid contents from large tanks, and it concerns apparatus for detecting a change in level of said liquid in a relatively short time. The apparatus comprises a housing having interior space for permitting said liquid therein, and a passageway near the bottom of said space for communicating with said large-tank liquid. It also comprises valve means associated with said passageway for cutting off communication during said relatively short time, and means for holding said housing partially submerged and fixed relative to the tank which holds said liquid. It also comprises highly accurate liquid level-detecting means in said housing, which detecting means comprises a submerged ultrasonic transmitter, and a partially immersed ultrasonic receiver. The detecting means also comprises circuit means including said receiver for meansuring the amplitude of ultrasonic signals generated by said receiver.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENTS

Figure 1:
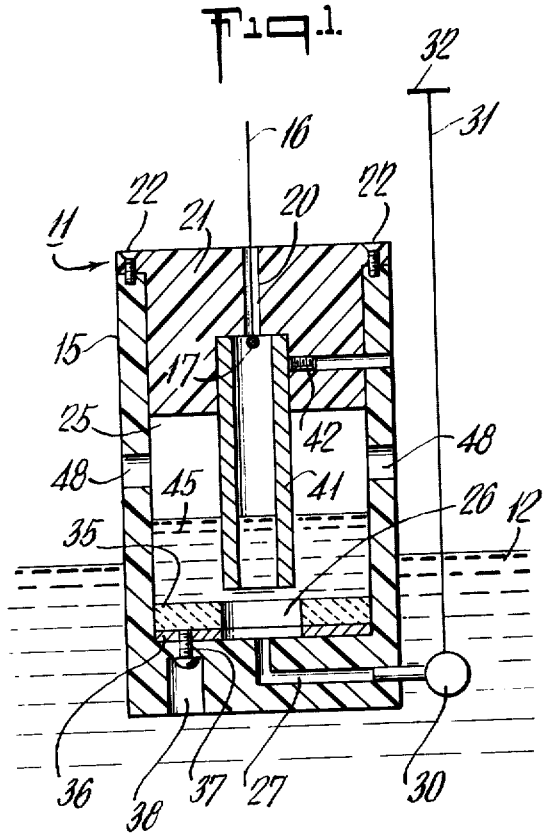
FIG. 1 is a schematic longitudinal cross-section illustrating a preferred form for the leak-detection apparatus according to the invention.
Figure 2:
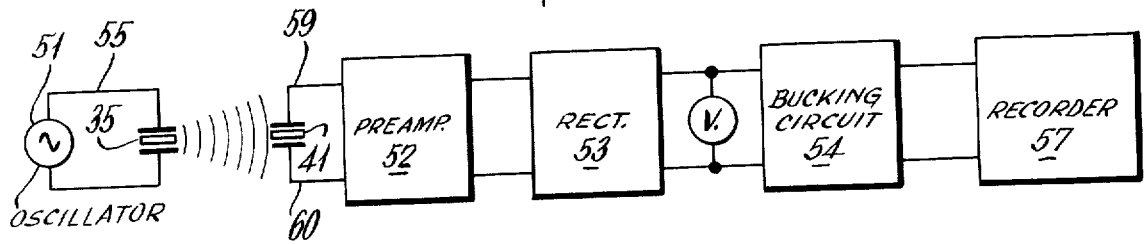
FIG. 2 is a block diagram illustrating the electrical system that is employed with the apparatus of FIG. 1.
Figure 3:
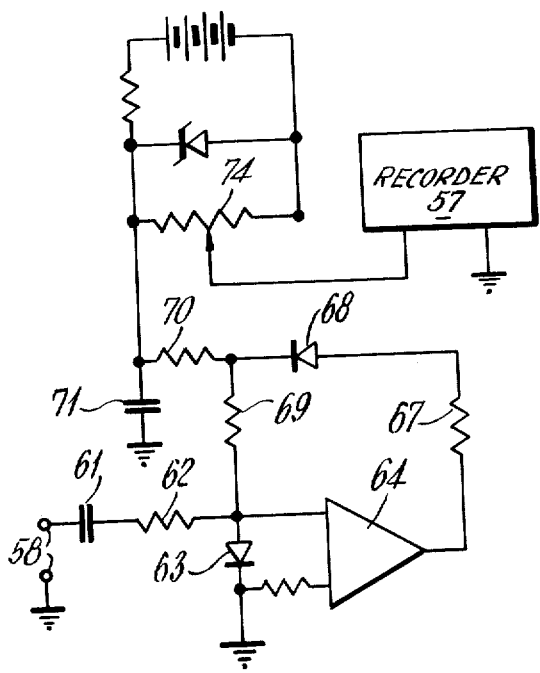
FIG. 3 is a circuit diagram of part of the electrical system illustrated in FIG. 2.

Referring to FIGS. 1, 2, and 3, a preferred embodiment of the invention will be described.

Thus, in FIG. 1, there is shown a liquid level-measuring instrument 11 that is suspended partially submerged in a body of liquid 12. This may be the liquid contents of a large-diameter storage tank (not shown). The instrument 11 includes a housing 15 that is preferably constructed of a material having acoustic impedance as close to that of the liquid 12 as is feasible. Thus, in most uses, especially for petroleum products, it is contemplated that a superior material for the housing 15 is polytetrafluoroethylene, commonly known as Teflon. This material combines the best acoustic impedance match of any useable solid, with good oleophobic qualities.

The instrument 11 may be suspended from the top, or otherwise fixed to the tank which holds the liquid 12. It may be accomplished in any feasible manner. For example, there is shown a wire 16 that has an enlarged ball 17 at the lower end thereof. Ball 17 acts to support the instrument 11 by contacting the edges of a vertical hole 20 which extends through the center of a solid upper member 21 that is part of the housing 15. Member 21 fits into the top of the housing and may be held in place in any feasible manner, e.g., by means of a series of peripherally located screws 22.

Housing 15 has an interior space 25 that is connected via a central opening 26 located at the bottom, and a passageway 27 that goes to the exterior of the housing. This connects the interior 25 with the body of liquid 12, via a valve 30 that has an extended control member 31 with a handle 32 for opening and closing the valve 30 from above the liquid 12. It will be appreciated that the valve 30 as well as its control elements 31 and 32 are entirely schematically illustrated. Thus, a practical arrangement would make use of a solenoid-type valve (not shown) with electric controls.

The central opening 26 is formed by the open center of a flat cylindrical crystal 35. This is an acoustic transmitter that is mounted upon a lead base 36, which is held in place in the housing 15 by any appropriate fastening such as a plurality of screws like a screw 37 illustrated, which is applied with a countersink bore 38. It will be understood that there would be several of such screws around the annulus of base 36 underneath the crystal 35. It may be noted that the crystal 35 is a piezoelectric crystal element which is mounted on the lead base 36 so as to generate ultrasonic frequency when the instrument is in operation.

By using the lead base 36, the efficiency of the instrument 11 is enhanced because there is a close acoustic impedance match between lead and the crystal 35. Consequently, there is substantially no acoustic energy reflected at the interface between crystal 35 and the base 36 so that the down-going energy is attenuated by the lead. Also, the interface becomes a platform from which the entire crystal 35 expands so that the displacement at the upper side of the crystal is increased. It may be noted that it is preferable to attach the crystal 35 to the base 36 by using a conductive epoxy solder (not shown).

There is another crystal 41 that is a hollow cylindrical shape and is mounted in the upper member 21 of the housing 15. The mounting may be done in any feasible manner, e.g., by having one or more set screws 42 applied radially through the housing 15 and the member 21. It will be observed that crystal 41 is mounted coaxially with the transmitter crystal 35. Also, the outside diameter of crystal 41 is less than the inside diameter of opening 26 of the crystal 35.

Figure 4:
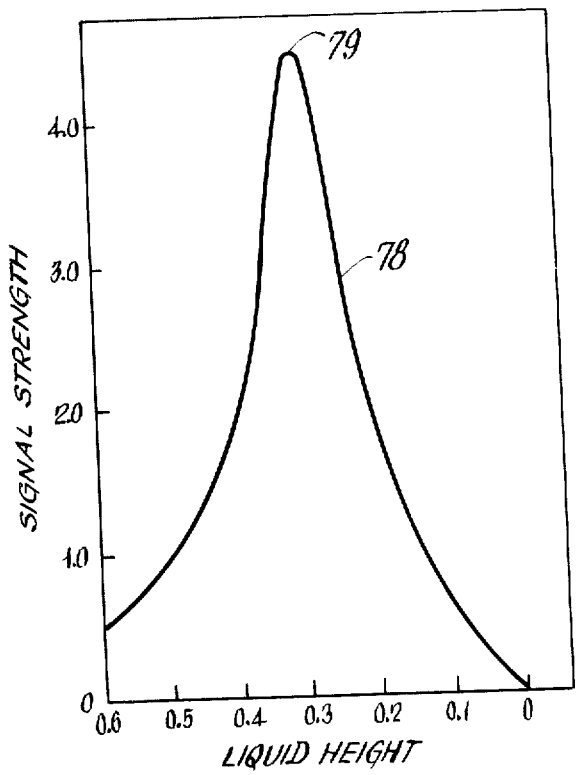
FIG. 4 is a graph illustrating the amplitude of signal generated in the receiver in relation to the height of the liquid on the receiver crystal.

Crystal 41 extends down so as to be partially immersed in liquid 45 that is within the housing 15, i.e., that part of the body of liquid 12 that has flowed into the inner space 25 of the housing 15. When the instrument 11 is first placed in operation within the tank containing the body of liquid 12, the valve 30 will be open and the liquid 45 will rise to the same level as that of the body of liquid 12. By proper design of the dimensions of the crystal 41, which include the three degrees-of-freedom, viz. length, thickness, and circumferential measurement, the maximum height of immersion of crystal 41 will be set to fall within the distance covered by one-half wavelength of the ultrasonic frequency at which the transmitter crystal 35 is driven. The reason for this will be more fully explained hereafter in connection with the description of FIG. 4.

The crystals 35 and 41 might be any piezoelectric material adaptable to the indicated use. However, they are preferably Lead Zirconate-Lead Titanate crystals which are commercially available.

It is important to note that there are a plurality of openings 48 through the sides of the housing 15. These connect the inside space 25 with the atmosphere above the body of liquid 12. In this manner, the ambient conditions which exist in relation to the body of liquid 12, will also exist on the inside of the instrument 11 at the space above the inner liquid 45. This will avoid any differences in these two liquid levels that might otherwise be caused by evaporation losses or thermal expansion. Such will be the case because the changes will act on both bodies of liquid equally whether or not the valve 30 is closed.

Referring to FIG. 2, it will be observed that the transmitter crystal 35 is electrically connected to an oscillator 51 that is schematically indicated. This oscillator will have a predetermined frequency which is in the ultrasonic range. Specifically the frequency is chosen such that an appropriate wavelength of acoustic energy will be applied to the liquid 45 in order that a resonant condition for this frequency will exist near the middle of the maximum variation of height of the liquid 45 above the bottom of the crystal 41. Consequently, the variation of such height of a liquid column will cause a directly proportional variation in the amplitude of the electrical signals that are generated by the receiving piezoelectric crystal 41. Such signals are amplified by a preamplifier 52 and then rectified by a rectifier 53. Thereafter, following the bucking out of a constant DC value in a bucking circuit 54, the output signals are fed to a recorder 57.

OPERATION

In order to detect a change in the level of the body of liquid 12, the instrument 11 is lowered through a gage hatch or the like in the roof (not shown) of the tank which contains the liquid 12. It is then fixedly suspended partly immersed, in the manner indicated above, so that the transmitting crystal 35 is submerged while the receiving crystal 41 is partly immersed. It will be understood that the valve 30 is open to permit the liquids 12 and 45 to equalize the surface levels thereof.

Next, the valve 30 is closed to isolate the liquid 45 within the instrument, and this fixes a point of reference. Following a relatively short time thereafter, e.g., about two hours, the valve 30 is opened, and if there has been any leakage, the liquid 45 will flow out through the opening 26, passage 27 and valve 30 until the liquid levels again equalize. This change in level of liquid 45 will cause a change in the amplitude of the signal at the recorder 57 which can be calibrated to indicate how much leakage has occurred.

A more specific circuit diagram is shown in FIG. 3 where there is a pair of input terminals 58 that are connected to the receiver crystal 41, as indicated in FIG. 2. It will be understood that the outer and inner cylindrical surfaces of the crystal 41 are electroded with electrically conductive surfaces (not shown), and circuit wires 59 and 60 (FIG. 2) are not shown in FIG. 1 but would preferably be a coaxial pair of conductors that are connected to the electroded surfaces. Similarly, the upper and lower flat annular disk surfaces of the transmitter crystal 35 are covered with electrically conductive material to form electrodes, as indicated in FIG. 2. Also, in this case too, there are circuit wires 55 and 56 indicated in FIG. 2 but not illustrated in FIG. 1. These would also preferably be a coaxial pair of conductors, and in both cases the outer shield conductor would be grounded.

Again, with reference to FIG. 3, the signals will travel via a capacitor 61 and a resistor 62 to a diode 63 that is connected across the input of an amplifier 64. The output of amplifier 64 goes via a resistor 67 and a diode 68 in series therewith, to one side of a resistor 69 that acts in conjunction with another resistor 70 and a capacitor 71 to feed the rectified signal in bucking relation to the DC voltage across the output of a potentiometer 74, to the input of the recorder 57. It will be understood that the block-diagram elements 52, 53 and 54 of FIG. 2 are made up of groups of circuit elements shown in FIG. 3.

In the foregoing manner, the amplitude variations of signals generated by the crystal 41 may be measured and recorded so as to indicate very accurately changes in the liquid level of liquid 45 within the instrument 11. Thus, referring to FIG. 4, it will be noted that a curve 78 indicates the amplitude of signals being generated by the receiver crystal 41 in relation to the height of liquid into which the crystal is immersed. It will be observed that this amplitude variation is quite extensive in terms of relative signal strength over a liquid height measurement which is directly related to the wavelength of the acoustic energy. Thus, in the illustrated case, by using a frequency of 32 kilohertz in driving the transmitting crystal 35, a haalf-wavelength is about 0.5 inches, and the variation on either side of a quarter-wave resonant point 79 is a rapid change as indicated by the steepness of the curve 78. It has been found that the sensitivity is such that level changes of less than $3.0 \times 10^{-5}$ inches can be detected. Consequently, leak-testing over a short period of time is practical. For example, a 150-foot-diameter tank leaking at a rate of one barrel per day would lower the surface 330 microinches over a two-hour period. Such a measurement is easily resolved, as indicated.

Figure 5:
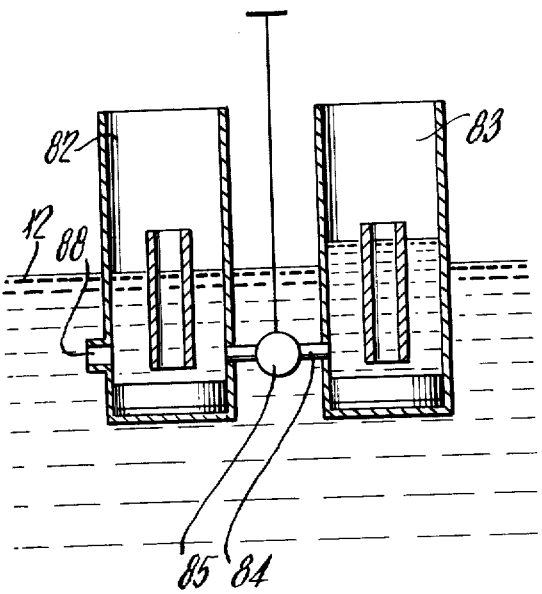
FIG. 5 is a schematic cross-section illustrating another modification of the invention.
Figure 6:
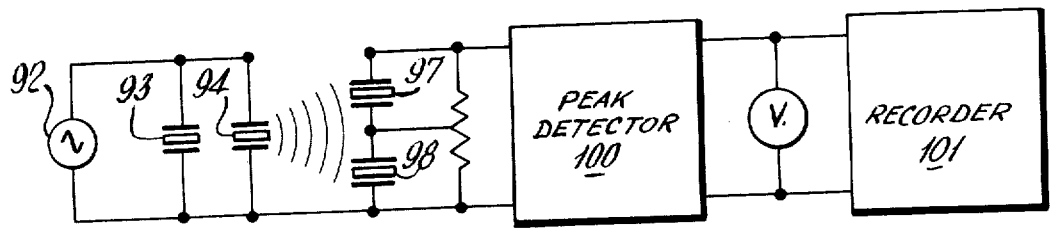
FIG. 6 is a block diagram of an electrical circuit that applies to the modification illustrated in FIG. 5.

FIGS. 5 and 6 illustrate a modified arrangement which may be employed, and that lends itself to continuous monitoring of the level of the liquid 12.

Thus, as indicated in FIG. 5 in a schematic manner, there are two separate liquid-level measuring instruments 82 and 83. These are interconnected for liquid flow by a pipe 84 that has a valve 85 therein. The instrument 82 has a free passage 88 connecting with the body of liquid 12. In operation, this arrangement will commence with the instruments 82 and 83 placed partially immersed in a manner like that employed for instrument 11, as illustrated in FIG. 1. Then the valve 85 will be closed, and thereafter the liquid-level differences may be continuously monitored since the two crystals are set up in a bridge circuit to indicate the differences. This arrangement is indicated in FIG. 6, where it will be noted that an oscillator 92 energizes both transmitting crystals 93 and 94 which are mounted in the instruments 82 and 83. The transmitted acoustic energy is then picked up by crystals 97 and 98 which are contained in the instruments 82 and 83, respectively. In this case the signals developed are applied in a bridge network 99 the output of which feeds a peak detector 100. The peak detector is connected to the input of a recorder 101 where the signal difference is noted and recorded.

Figure 7:
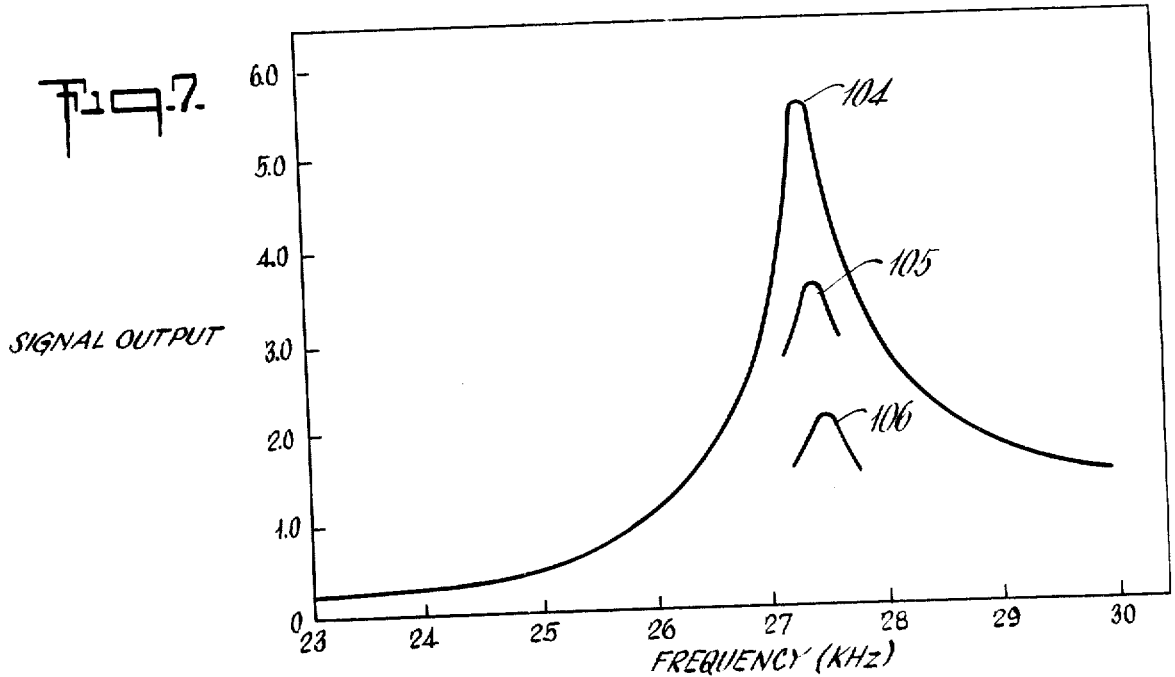
FIG. 7 is another graph illustrating a family of curves that would be developed by employing a different modification of the basic principle of the invention.

FIG. 7 illustrates another modification. This modification is merely indicated by means of showing the outputs obtained by another manner of carrying out the invention. Thus, instead of applying fixed frequency to the liquid by the transmitting crystal, the arrangement may be such as to apply a variable frequency. This is indicated by the abscissa of the graph illustrated in FIG. 7. Then, at the output of the recorder of the signals being generated from the receiver crystal, there will be a resonant peak for any given liquid level, as indicated by the plural peaks 104, 105 and 106, which will occur at different frequencies, depending upon the liquid level.

While the invention has been described above in considerable detail and in accordance with the applicable statutes, this is not to be taken as in any way limiting the invention, but merely as being descriptive thereof.

I claim:

1. Liquid level variation detector, comprising in combination
   submerged means for transmitting acoustic energy into said liquid,
   signal-transducer means immersed in said liquid a variable amount depending upon the said liquid level,
   said transducer means having a geometric configuration for producing a resonant condition at a predetermined amount of immersion, and
   electric circuit means including said transducer means for indicating said liquid level variation.

2. Liquid level variation detector according to claim 1, wherein
   said submerged means and said signal transducer means each comprise a piezoelectric crystal.

3. Liquid level variation detector according to claim 2, wherein
   said transducer configuration is hollow cylindrical, and
   said submerged means is located coaxially with said transducer.

4. Liquid level variation detector according to claim 3, wherein
   said acoustic energy is ultrasonic.

5. Liquid level variation detector according to claim 4, further comprising
   an ultrasonic oscillator for driving said submerged crystal, and wherein
   said electric circuit means comprises an amplifier and means for measuring the amplitude of ultrasonic acoustic energy generated by said transducer crystal.

6. Liquid level variation detector according to claim 5, wherein the maximum of said variable immersion is about one-half wavelength of said driving oscillator frequency.

7. Liquid level variation detector for highly accurate measurements, comprising in combination
   a flat, cylindrical annular piezoelectric crystal submerged in said liquid with the axis thereof perpendicular to the surface of said liquid,
   an ultrasonic oscillator and circuit means for driving said flat crystal to generate acoustic energy having a predetermined ultrasonic frequency,
   said flat crystal being mounted on a lead base for absorbing downward-directed acoustic energy,
   a hollow, cylindrical piezoelectric crystal mounted coaxially with said flat crystal and immersed a variable amount in said liquid depending upon the said liquid level,
   said variable immersion having a maximum range equal to about one-half wavelength of said predetermined frequency,
   an amplifier connected to said hollow crystal, and
   a recorder for measuring the amplitude of said acoustic energy generated by said hollow crystal.

8. In leak detection of liquid contents from large tanks, apparatus for detecting a change in level of liquid in a relatively short time, comprising in combination,
   a housing having interior space for permitting said liquid therein, and a passageway near the bottom of said space for communicating with said large-tank liquid,
   valve means associated with said passageway for cutting off communication during said relatively short time,
   means for holding said housing partially submerged and fixed relative to the tank holding said liquid, and
   highly accurate liquid level-detecting means in said housing, comprising
   a submerged ultrasonic transmitter comprising a piezoelectric crystal,
   a partially immersed ultrasonic receiver comprising a piezoelectric crystal and having a geometric configuration for producing a resonant condition at a predetermined amount of immersion, and
   circuit means including said receiver for measuring the amplitude of ultrasonic signals generated by said receiver.

9. In leak detection, apparatus according to claim 8, wherein
   said receiver is hollow cylindrical shaped, and
   said transmitter is located coaxially with said receiver.

10. In leak detection, apparatus according to claim 9, wherein
    said transmitter has a flat cylindrical annular configuration.

11. In leak detection, apparatus according to claim 10, further comprising
    second circuit means for driving said transmitter at a predetermined ultrasonic frequency.

12. In leak detection, apparatus according to claim 11, wherein
    said transmitter frequency is fixed.

13. In leak detection of liquid contents from large tanks, apparatus for detecting a change in level of said liquid in a relatively short time, comprising in combination
    a housing having interior space for permitting said liquid therein and being constructed of polytetrafluoroethylene,
    said housing including a passageway near the bottom of said space for communicating with said large-tank liquid, and vent means at the top of said space for equalizing ambient conditions with the atmosphere above said large-tank liquid,
    valve means associated with said passageway for cutting off communication during said relatively short time,
    means for suspending said housing at a fixed level partially submerged in said large-tank liquid, and
    highly accurate liquid level-detecting means in said housing comprising
    a submerged piezoelectric transmitter crystal having a flat cylindrical annular configuration, and mounted coaxially on a lead base with the axes thereof perpendicular to the surface of said liquid,
    a hollow cylindrical piezoelectric receiver crystal mounted coaxially with and above said submerged crystal,
    said last-named crystal having an outside diameter less than the inside diameter of said submerged crystal and being mounted for variable immersion in said liquid,
    an ultrasonic oscillator including circuit means for driving said transmitter crystal to generate acoustic energy having a predetermined ultrasonic frequency, and
    additional circuit means connected to said receiver crystal, including an amplifier and recording means for measuring the amplitude of ultrasonic signals generated by said receiver crystal.

* * * * *